(12) United States Patent
Mochizuki (10) Patent No.: US 10,072,808 B2
(45) Date of Patent: Sep. 11, 2018

(54) VEHICLE LAMP

(71) Applicant: Koito Manufacturing Co., Ltd., Tokyo (JP)

(72) Inventor: Mitsuyuki Mochizuki, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 15/638,612

(22) Filed: Jun. 30, 2017

(65) Prior Publication Data
US 2018/0010758 A1      Jan. 11, 2018

(30) Foreign Application Priority Data

Jul. 8, 2016   (JP) ................................. 2016-135708

(51) Int. Cl.
*F21V 21/00*   (2006.01)
*F21S 41/663*  (2018.01)
(Continued)

(52) U.S. Cl.
CPC .......... *F21S 41/663* (2018.01); *B60Q 1/1423* (2013.01); *B60Q 1/16* (2013.01);
(Continued)

(58) Field of Classification Search
CPC .. B60Q 1/1423; B60Q 1/16; B60Q 2300/056; B60Q 2300/141; F21S 41/147;
(Continued)

(56) References Cited

U.S. PATENT DOCUMENTS

2014/0198516 A1*   7/2014   Tajima .................... F16H 19/08
                                                      362/523
2016/0071699 A1*   3/2016   Segawa ............... H01J 37/3288
                                                      204/298.24
(Continued)

FOREIGN PATENT DOCUMENTS

JP     2010-137693 A    6/2010
JP     2012-022988 A    2/2012
(Continued)

OTHER PUBLICATIONS

An Office Action dated Apr. 12, 2018, issued from the Korean Intellectual Property Office (KIPO) of Korean Patent Application No. 10-2017-0083581 and a Partial English translation thereof.

*Primary Examiner* — Ali Alavi
(74) *Attorney, Agent, or Firm* — Abelman, Frayne & Schwab (57) ABSTRACT

Disclosed is a vehicle lamp including a pair of lamp modules configured to form a pair of left and right light distribution patterns by irradiation light therefrom. Each lamp module includes a first lamp unit that uses a light emitting diode as a light source and a second lamp unit that uses a laser diode as a light source, a pair of first light distribution patterns is formed by irradiation light from the first lamp unit, and a pair of second light distribution patterns, which is smaller and brighter than the first light distribution patterns, is formed by irradiation light from the second lamp unit. The first light distribution patterns are formed with a predetermined distance therebetween in a left-and-right direction, the second light distribution patterns are formed to partially overlap each other between the pair of first light distribution patterns and to partially overlap the first light distribution patterns.

8 Claims, 6 Drawing Sheets

(51) Int. Cl.
  *B60Q 1/14*     (2006.01)
  *B60Q 1/16*     (2006.01)
  *F21S 41/14*    (2018.01)
  *F21S 41/147*   (2018.01)
  *F21S 41/62*    (2018.01)
  *F21S 41/32*    (2018.01)
  *F21S 41/60*    (2018.01)

(52) U.S. Cl.
  CPC ............ *F21S 41/147* (2018.01); *F21S 41/18* (2018.01); *F21S 41/32* (2018.01); *F21S 41/62* (2018.01); *B60Q 2300/056* (2013.01); *B60Q 2300/41* (2013.01); *F21S 41/60* (2018.01)

(58) Field of Classification Search
  CPC .. F21S 41/18; F21S 41/32; F21S 41/60; F21S 41/62; F21S 41/663
  See application file for complete search history.

(56) References Cited

U.S. PATENT DOCUMENTS

2016/0159273 A1* 6/2016 Nakazato ............. B60Q 1/1423
                                                    315/79
2016/0332568 A1* 11/2016 Kim ........................ B60Q 1/50

FOREIGN PATENT DOCUMENTS

KR    10-2016-0077726 A    7/2016
WO       2010-140661 A     6/2010

* cited by examiner

VEHICLE LAMP

CROSS-REFERENCE TO RELATED APPLICATIONS

This application is based on and claims priority from Japanese Patent Application No. 2016-135708, filed on Jul. 8, 2016 with the Japan Patent Office, the disclosure of which is incorporated herein in its entirety by reference.

TECHNICAL FIELD

The present disclosure relates to a vehicle lamp configured to form a pair of left and right light distribution patterns by irradiation light from a pair of lamp modules.

BACKGROUND

In the related art, there has been known a vehicle lamp configured to form a pair of left and right light distribution patterns by irradiation light from a pair of lamp modules.

Japanese Patent Laid-Open Publication No. 2010-140661 describes such a vehicle lamp in which each lamp module is configured so as to be rotatable in a left-and-right direction.

SUMMARY

By adopting the vehicle lamp described in Japanese Patent Laid-Open Publication No. 2010-140661, a pair of left and right light distribution patterns may be formed integrally or separately. This enables the forward visibility of a driver in an own vehicle (hereinafter, referred to as an "own vehicle driver") to be secured without giving glare to a driver in an oncoming vehicle or a driver in a preceding vehicle.

However, since the pair of left and right light distribution patterns is formed by light emitted from both lamp modules, which use a light emitting diode as a light source, the maximum luminous intensity may not be sufficiently increased even if the light distribution patterns partially overlap each other. Therefore, there is room for improvement in increasing the forward visibility of an own vehicle driver.

The present disclosure has been made in view of such circumstances, and provides a vehicle lamp configured to form a pair of left and right light distribution patterns by irradiation light from a pair of lamp modules, thereby enhancing the forward visibility of an own vehicle driver.

The present disclosure solves the above-described problems by configuring each lamp module with two lamp units and then contriving a configuration of both of the lamp units.

That is, the present disclosure provides a vehicle lamp including a pair of left and right light distribution patterns configured to form a pair of left and right light distribution patterns by irradiation light therefrom. Each of the lamp modules includes a first lamp unit that uses a light emitting diode as a light source and a second lamp unit that uses a laser diode as a light source, and is configured to form a horizontally elongated first light distribution pattern by irradiation light from the first lamp unit and to form a second light distribution pattern, which is smaller and brighter than the first light distribution pattern, by irradiation light from the second lamp unit. The first lamp units in the pair of lamp modules are configured to form a pair of the first light distribution patterns with a predetermined distance therebetween in a left-and-right direction. The second lamp units in the pair of lamp modules are configured to form a pair of the second light distribution patterns so as to partially overlap each other between the pair of first light distribution patterns and to partially overlap the pair of first light distribution patterns, and the light emitting diode and the laser diode are configured so as to he selectively turned on.

"The pair of left and right light distribution patterns" may form a high beam light distribution pattern by themselves, or may form an additional light distribution pattern to be added to a low beam light distribution pattern when the high beam light distribution pattern is formed.

A positional relationship between "the first and second lamp units" is not particularly limited, and may adopt, for example, a configuration in which the first and second lamp units are disposed in two upper and lower stages, or a configuration in which the first and second lamp units are disposed parallel to each other in the horizontal direction.

The, vehicle lamp according to the present disclosure is configured to form the pair of left and right light distribution patterns by irradiation light from the pair of lamp modules. However, since each lamp module is configured to form the horizontally elongated first light distribution pattern by irradiation light from the first lamp unit that uses the light emitting diode as a light source and to form the second light distribution pattern, which is smaller and brighter than the first light distribution pattern, by irradiation light from the second lamp unit that uses the laser diode as a light source, it is possible to sufficiently secure the brightness of the portion in which the second light distribution pattern is formed in the pair of left and right light distribution patterns.

At this time, since the first lamp units in the pair of lamp modules are configured to form the pair of first light distribution patterns with a predetermined distance in the left-and-right direction, and the second lamp units in the pair of lamp modules are configured to form the pair of second light distribution patterns to partially overlap each other between the pair of first light distribution patterns and to partially overlap the pair of first light distribution patterns, and since each light emitting diode and each laser diode are configured to be selectively turned on, the following operational effects may be obtained.

That is, by turning on all of the respective light emitting diodes and the respective laser diode, a single horizontally elongated light distribution pattern may be formed by the pair of left and right first light distribution patterns and the pair of left and right second light distribution patterns located between the first light distribution patterns. At this time, since the horizontally elongated light distribution pattern is formed as a light distribution pattern in which the central portion thereof in the horizontal direction is bright, the light distribution pattern may widely irradiate the traveling path in front of a vehicle and then brightly irradiate a remote distance area.

In addition, by selectively turning off each light emitting diode and each laser diode according to the vehicle traveling situation to form a light distribution pattern in which a part of the horizontally elongated light distribution pattern is omitted, it is possible to secure the forward visibility of an own vehicle driver without giving glare to a driver in an oncoming vehicle or a driver in a preceding vehicle.

According to the present disclosure described above, in the vehicle lamp configured to form the pair of left and right light distribution patterns by irradiation light from the pair of lamp modules, it is possible to increase the forward visibility of an own vehicle driver.

In addition, according to the present disclosure, the above-described operational effects may be obtained without requiring the rotation of each lamp module in the left-and-right direction. Thus, it is possible to make a lamp configuration inexpensive.

In the above-described configuration, when the first lamp unit of each lamp module is configured to form, as the first light distribution pattern, a light distribution pattern having a cutoff line that extends in the up-and-down direction at the center side of the pair of left and right light distribution patterns, it is possible to further increase the forward visibility of an own vehicle driver without giving glare to a preceding vehicle driver.

In the above configuration, when the second lamp unit of each lamp module is configured to form the second light distribution pattern at a position near the lower end edge of the first light distribution pattern, it is possible to prevent the short distance area of the traveling path in front of the vehicle from becoming excessively bright and to sufficiently increase the forward visibility of a corresponding vehicle driver.

In the above configuration, each lamp module may be configured such that the first and second lamp units are integrally rotatable in the left-and-right direction. With this configuration, according to the vehicle traveling situation, it may be easy to irradiate the traveling path in front of a vehicle widely, to increase remote distance visibility, or to increase the forward visibility of an own vehicle driver without giving glare to an oncoming vehicle driver or a preceding vehicle driver.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawing, which form a part hereof. The illustrative embodiments described in the detailed description, drawing, and claims are not meant to be limiting. Other embodiments may be utilized, and other changes may be made, without departing from the spirit or scope of the subject matter presented here.

Hereinafter, exemplary embodiments of the present disclosure will be described with reference to the drawings.

First, a first exemplary embodiment of the present disclosure will be described.

Figure 1:
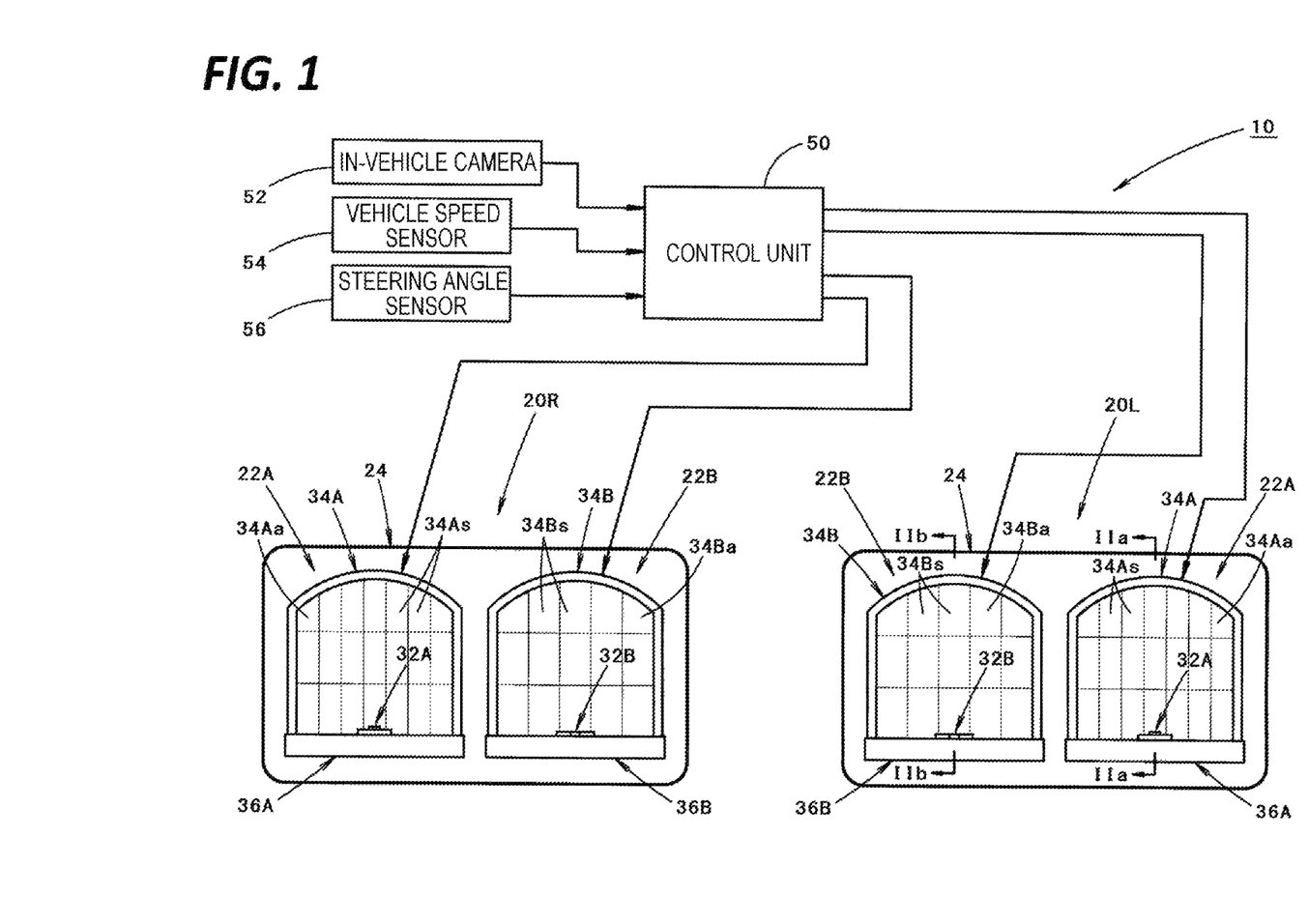
FIG. 1 is a front view illustrating a vehicle lamp according to a first exemplary embodiment of the present disclosure.

FIG. 1 is a front view illustrating a vehicle lamp 10 according to the present exemplary embodiment.

As illustrated in FIG. 1, the vehicle lamp 10 includes a pair of left and right lamp modules 20L and 20R, a control unit 50, an in-vehicle camera 52 configured to capture an image of a scene in front of a vehicle, a vehicle speed sensor 54, and a steering angle sensor 56.

The two left and right lamp modules 201, and 20R are lamp modules disposed on both left and right sides of the front end portion of the vehicle, and have a bilaterally symmetrical configuration. Each of the lamp modules 20L and 20R is accommodated in a lamp chamber, which is defined by a lamp body (not illustrated) and a translucent cover knot illustrated).

Each of the lamp modules 20L and 20R includes first and second lamp units 22A and 22B, which are disposed side by side in the left-and-right direction, and a support frame 24 configured to support the first and second lamp units 22A and 22B.

The control unit 50 is configured such that a signal of image data captured by the in-vehicle camera 52, a vehicle speed signal from the vehicle speed sensor 54, and a steering angle signal from the steering angle sensor 56 are input thereto. In addition, based on these input signals, the control unit 50 is configured to separately perform a turn-on/off control of the first and second lamp units 22A and 22B of each of the lamp modules 20L and 20R.

As described above, since the pair of left and right lamp modules 20L and 20R has a bilaterally symmetrical configuration, hereinafter, a configuration of the first and second lamp units 22A and 22B of the lamp module 20L on the left side (the right side when viewing from the front side of the lamp) will be described.

Figure 2A:
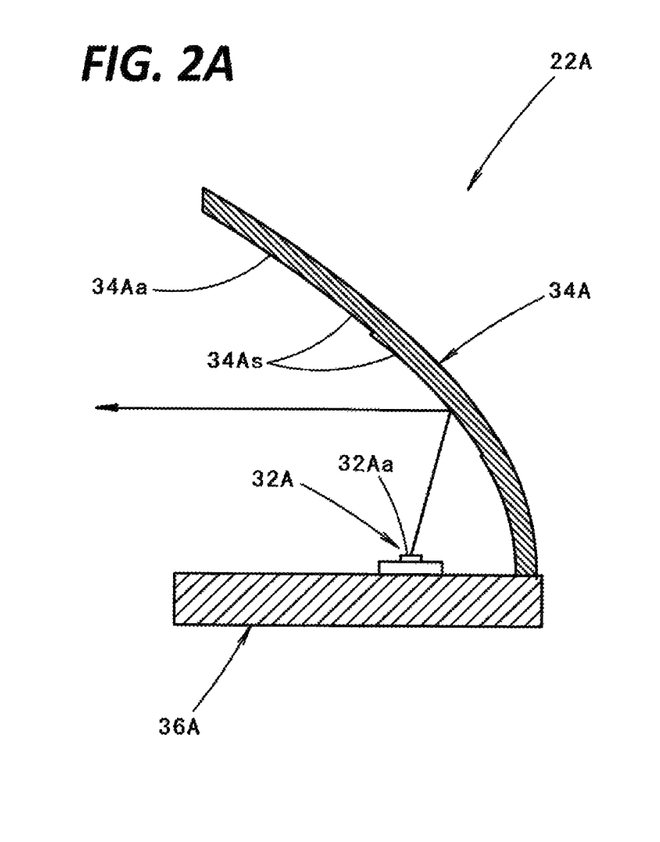
FIG. 2A is a cross-sectional view taken along line IIa-IIa of FIG. 1.
Figure 2B:
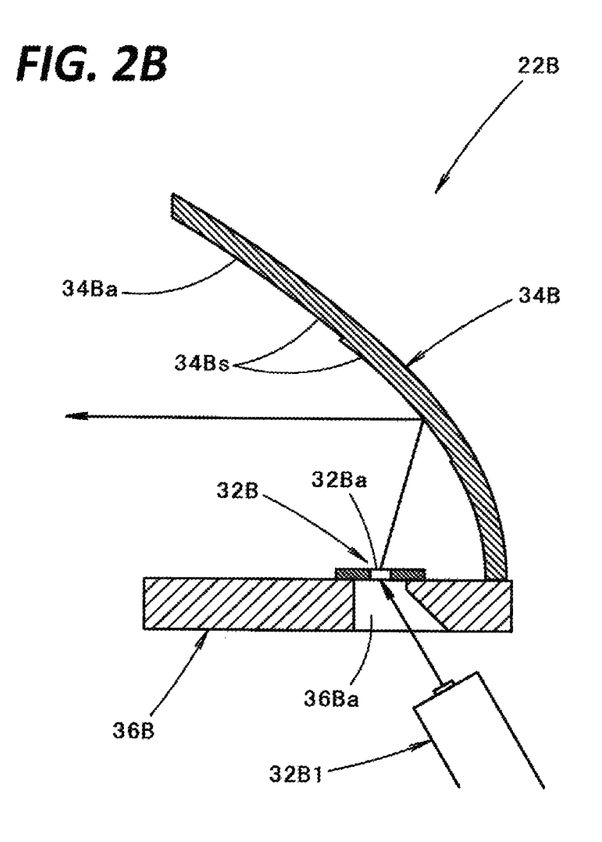
FIG. 2B is a cross-sectional view taken along line IIb-IIb of FIG. 1.

FIG. 2A is a cross-sectional view taken along line IIa-IIa of FIG. 1, and FIG. 2B is a cross-sectional view taken along line IIb-IIb of FIG. L As illustrated in FIGS. 2A and 2B, both the first and second lamp units 22A and 22B are configured as a parabolic lamp unit.

That is, the first lamp unit 22A includes a light emitting diode 32A as a light source, a reflector 34A that reflects light emitted from the light emitting diode 32A forward, and a base member 36A that supports the light emitting diode 32A and the reflector 34A.

The light emitting diode 32A is a white light emitting diode that includes a light emitting surface 32Aa having a horizontally elongated rectangular shape, and is disposed such that the light emitting surface 32Aa faces upward.

The reflector 34A is disposed to cover the light emitting diode 32A from the upper side. The reflecting surface 34Aa of the reflector 34A is formed of a plurality of reflecting elements 34As, and controls the reflection of light from the light emitting diode 32A by the plurality of reflecting elements 34As.

The base member 36A is configured as a plate-shaped member that extends along a horizontal plane.

Meanwhile, the second lamp unit 22B includes a laser diode 32B as a light source, a reflector 34B that reflects light emitted from the laser diode 32B forward, and a base member 36B that supports the laser diode 32B and the reflector 34B.

The laser diode 32B is formed of a phosphor that emits white light by laser light emitted from a laser light generation source 32B1, and is disposed such that a light emitting surface 32Ba thereof faces upward.

The reflector 34B is disposed to cover the laser diode 32B from the upper side. The reflecting surface 34Ba of the reflector 34B is formed of a plurality of reflecting elements 34Bs, and controls the reflection of light from the laser diode 32B by the multiple reflecting elements 34Bs.

The base member 36B is configured as a plate-shaped member that extends along a horizontal plane. The base member 36B is provided with an opening 36Ba for irradiating the phosphor with laser light emitted from the laser light generation source 32B1.

Figure 3A:
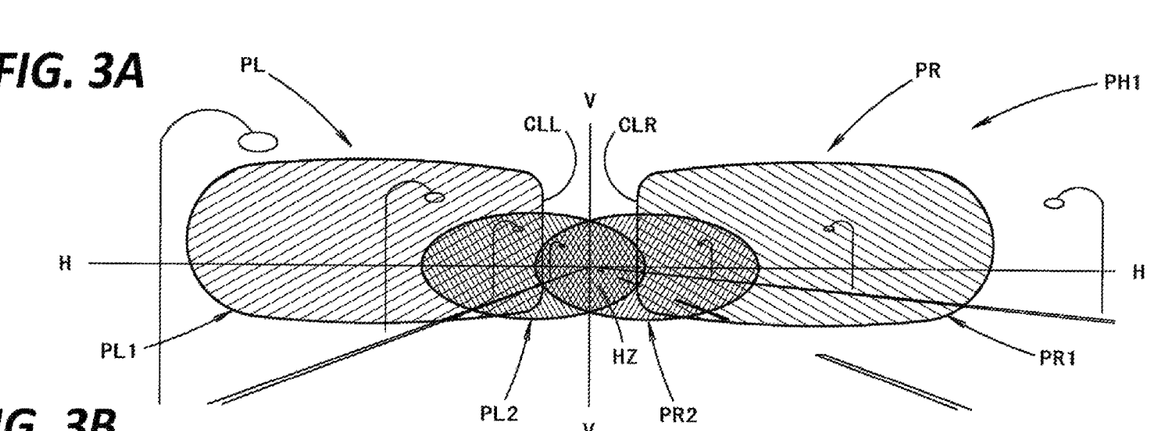
FIG. 3A is a perspective view of high beam light distribution patterns formed by irradiation light from the vehicle lamp.
Figure 3B:
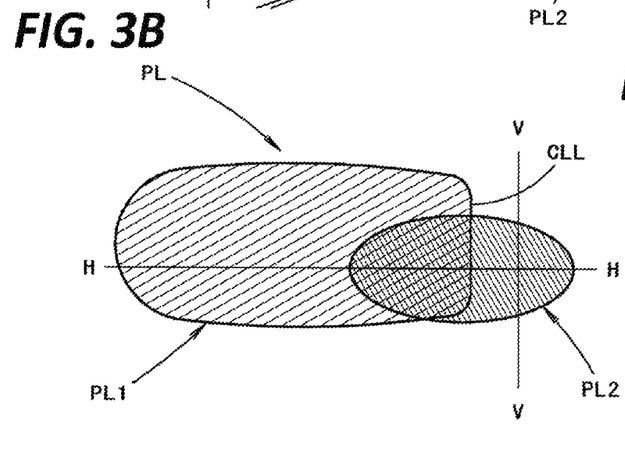
FIGS. 3B and 3C are views illustrating the high beam light distribution patterns in a separated state, respectively.
Figure 3C:
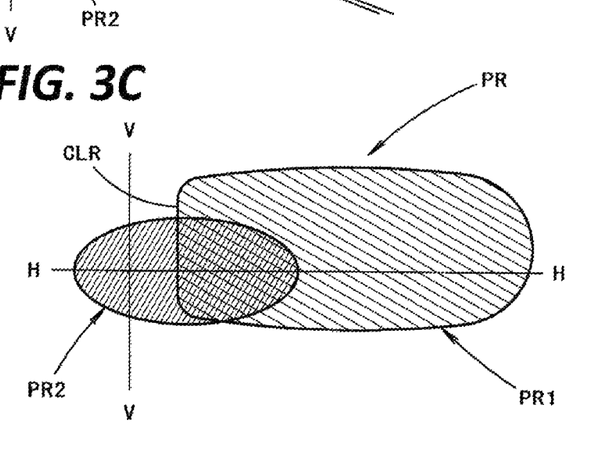

FIG. 3A is a perspective view illustrating a high beam light distribution pattern PH1 formed on a virtual vertical screen, which is disposed at a position of 25 m in front of the vehicle, by forward irradiation light from the vehicle lamp 10 according to the present exemplary embodiment, FIG. 3B and FIG. 3C are exploded views illustrating the high beam light distribution pattern PH1.

As illustrated in FIG. 3A, the high beam light distribution pattern PL is a combined light distribution pattern in which a pair of left and right light distribution patterns PL and PR partially overlaps each other, and is formed in a state where (all of the light emitting diode 32A and the laser diode 32B of) the first and second lamp units 22A and 22B of the respective lamp modules 20L and 20R are turned on.

As illustrated in FIG. 3B, the left light distribution pattern PL is a light distribution pattern formed by irradiation light from the left lamp module 20L, and is formed as a combined light distribution pattern of a first light distribution pattern PL1 formed by irradiation light from the first lamp fitting unit 22A and a second light distribution pattern PL2 formed by irradiation light from the second lamp unit 22B.

The first light distribution pattern PL1 is formed as a horizontally elongated light distribution pattern, which is greatly wider in the left-and-right direction than in the up-and-down direction, in the space on the left side of the line V-V, which is the vertical line passing through H-V, which is the vanishing point in the front direction of the lamp.

The first light distribution pattern PL1 is formed, with regard to the up-and-down direction, so as to be greatly wider in the upper side than in the lower side of the line H-H, which is the horizontal line passing through H-V.

The right end edge of the first light distribution pattern PL1 (that is, the end edge near the line V-V) is formed as a cutoff line CLL that extends in the up-and-down direction. The cutoff line CLL is formed so as to extend in the vertical direction at the position slightly spaced apart leftward from the line V-V.

On the other hand, the second light distribution pattern PL2 is formed as a light distribution pattern that is smaller and brighter than the first light distribution pattern PL1, and slightly overlaps the first light distribution pattern PL1.

The second light distribution pattern PL2 is a slightly horizontally elongated spot-shaped light distribution pattern, and is formed so as to extend across the cutoff line CLL and the line V-V in the left-and-right direction at the position near the lower end edge of the first light distribution pattern PL1.

At this time, the second light distribution pattern PL2 is formed such that it is substantially equally widened upward and downward with respect to the line H-H, and the lower end edge thereof has substantially the same height as the lower end edge of the first light distribution pattern PL1. In addition, substantially the right half of the second light distribution pattern PL2 protrudes rightward from the cutoff line CLL of the first light distribution pattern PL1, and the amount of rightward protrusion thereof is set to a value that is slightly larger than twice the distance between the cutoff line CLL and the line V-V.

The second light distribution pattern PL2 is formed as an extremely bright light distribution pattern since the laser diode 32B is used as a light source of the second lamp unit 22B.

As illustrated in FIG. 3C, the right light distribution pattern PR is a light distribution pattern formed by irradiation light from the right lamp module 20R, and is formed as a combined light distribution pattern of a first light distribution pattern PR1 formed by irradiation light from the first lamp unit 22A and a second light distribution pattern PR2 formed by irradiation light from the second lamp unit 22B.

The first light distribution pattern PR1 is formed to have; a shape and luminous intensity distribution that are horizontally symmetrical to those of the first light distribution pattern PL1 about the line V-V.

That is, the first light distribution pattern PR1 is formed such that the left end edge thereof corresponds to a cutoff line CLR that extends in the up-and-down direction, and the cutoff line CLR extends in the vertical direction at the position slightly spaced apart rightward from the line V-V.

The second light distribution pattern PR2 is formed to have a shape and luminous intensity distribution that are horizontally symmetrical to those of the second light distribution pattern PL2 about the line V-V.

That is, the second light distribution pattern PR2 is formed as a light distribution pattern that is smaller and brighter than the first light distribution pattern PR1, and partially overlaps the first light distribution pattern PR1.

As illustrated in FIG. 3A, the high beam light distribution pattern PH1 is formed as a horizontally elongated light distribution pattern, which extends in both the left and right sides about the line V-V, as the pair of left and right light distribution patterns PL and PR partially overlap each other.

At this time, in the high beam light distribution pattern PH1, the second light distribution patterns PL2 and PR2 of the pair of left and right light distribution patterns PL and PR overlap each other by about half, and the ends of the respective second light distribution patterns PL2 and PR2 overlap the respective first light distribution patterns PR1 and PL1 on the other side.

Thereby, the high beam light distribution pattern PH1 is formed as a horizontally elongated light distribution pattern having an extremely bright high luminous intensity area HZ about H-V, and as a result, the high beam light distribution pattern PH1 is formed to sufficiently secure the remote distance visibility of an own vehicle driver.

Figure 4A:
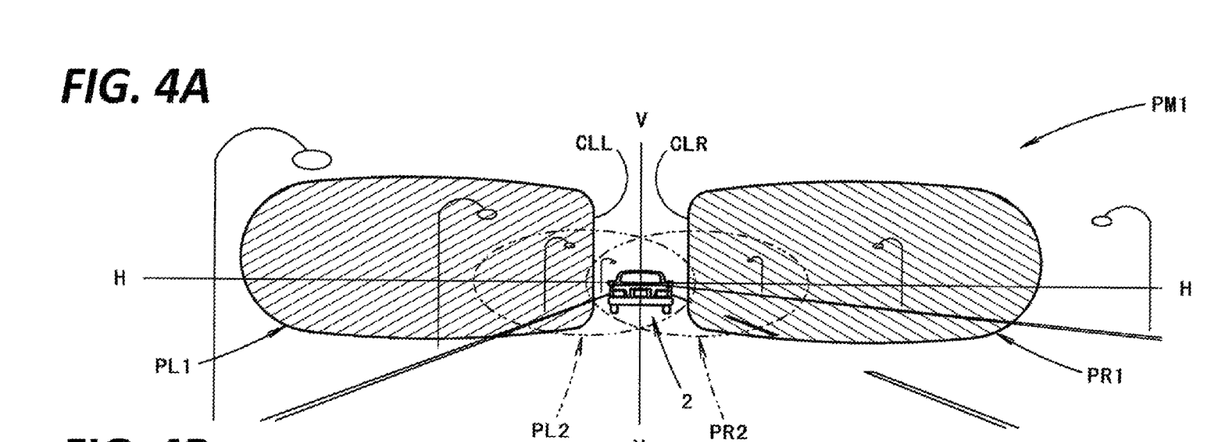
FIGS. 4A and 4B are perspective views illustrating two types of light distribution patterns, respectively, in which the high beam light distribution patterns are partially omitted.
Figure 4B:
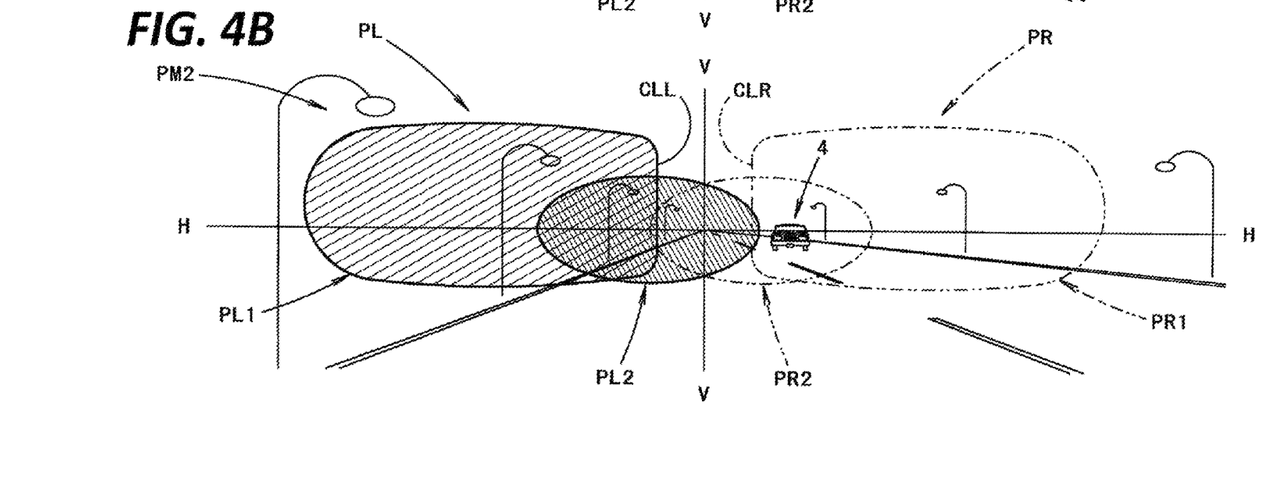

FIGS. 4A and 4B are perspective views illustrating two types of light distribution patterns PM1 and PM2, respectively, in which a part of the high beam distribution pattern PH1 is omitted.

The light distribution pattern PM1 illustrated in FIG. 4A is a light distribution pattern formed when the second lamp units 22B of the respective lamp modules 20L and 20R are turned off in a state where the first lamp units 22A of the respective lamp modules 20L and 20R are turned on. Compared to the high beam light distribution pattern PH1, the second light distribution patterns PL2 and PR2 of the respective light distribution patterns PL and PR are omitted.

That is, the light distribution pattern PM1 is formed only by the pair of left and right first light distribution patterns PL1 and PR1, and an area interposed between the cutoff lines CLL and CLR thereof is a dark portion. Therefore, even in a case where a preceding vehicle 2 exists in the traveling path in front of a corresponding vehicle, the preceding vehicle 2 may not be irradiated, and the areas on the left and right sides thereof may be irradiated. Thus, it is possible to sufficiently secure the forward visibility of an own vehicle driver without giving glare to a driver of the preceding vehicle 2.

The light distribution pattern PM2 illustrated in FIG. 4B is a light distribution pattern formed when the first and second lamp units 22A and 22B of the right lamp module 20R are turned off in a state where the first and second lamp units 22A and 22B of the left lamp module 20R are turned on. Compared to the high beam light distribution pattern PH1, the right light distribution pattern PR is omitted.

That is, the light distribution pattern PM2 is formed only by the left light distribution pattern PL, and the area on the right side thereof is a dark portion. Therefore, even in a case where an oncoming vehicle 4 exists in the traveling path in front of a corresponding vehicle, the oncoming vehicle 4 may not be irradiated and the area on the left side thereof may be irradiated. Thus it is possible to sufficiently secure the forward visibility of an own vehicle driver without giving glare to a driver of the oncoming vehicle 4.

In that event, in the traveling path in front of the vehicle, since the area near H-V is brightly irradiated by the second light distribution pattern PL2 of the left light distribution pattern PL, it is possible to secure the remote distance visibility of an own vehicle driver.

In addition, the position detection of the preceding vehicle 2 or the oncoming vehicle 4 is performed in a manner in which the control unit 50 calculates, for example, the width and the center position of the preceding vehicle 2 or the oncoming vehicle 4 based on image data of the preceding vehicle 2 or the oncoming vehicle 4 input from the in-vehicle camera 52. Based on the result of position detection, the control unit 50 performs the turn-on/off control of (the light emitting diode 32A and the laser diode 32B of) the first and second lamp units 22A and 22B of the respective lamp modules 20L and 20R.

Next, the operational effect of the present exemplary embodiment will be described.

The vehicle lamp 10 according to the present exemplary embodiment is configured to form a pair of left and right light distribution patterns PL and PR by irradiation light from the pair of lamp modules 20L and 20R. However, since each of the lamp modules 20L and 20R is configured such that the horizontally elongated first light distribution pattern PL1 or PR1 is formed by irradiation light from the first lamp unit 22A that uses the light emitting diode 32A as a light source, and the second light distribution pattern PL2 or PR2, which is smaller and brighter than the first light distribution pattern PL1 or PR1, is formed by irradiation light from the second lamp unit 22B that uses the laser diode 32B as a light source, it is possible to sufficiently secure the brightness of the portions in which the second light distribution patterns PL2 and PR2 are formed in the pair of left and right light distribution patterns PL and PR.

At this time, the first lamp units 22A in the pair of lamp modules 20L and 20R are configured to form the pair of first light distribution patterns PL1 and PR1 with a predetermined distance therebetween in the left-and-light direction. On the other hand, since the second lamp units 22B in the pair of lamp modules 20L and 20R are configured to form the pair of second light distribution patterns PL2 and PR2 to partially overlap each other between the pair of first light distribution patterns PL1 and PR1 and to partially overlap the pair of first light distribution patterns PL1 and PR1, and since each light emitting diode 32A and each laser diode 32B are configured to be selectively turned on, the following operational effect may be acquired.

That is, by turning on all of respective light emitting diodes 32A and respective laser diodes 32B, the high beam light distribution pattern PH1, which is a single horizontally elongated light distribution pattern, may be formed by the pair of left and right first light distribution patterns PL1 and PR1 and the pair of left and right second light distribution patterns PL2 and PR 2 therebetween. At this time, since the high beam light distribution pattern PH1 is formed as a light distribution pattern in which the center portion thereof in the left-and-right direction is bright, the traveling path in front of the vehicle may be widely irradiated and the remote distance area thereof may be brightly irradiated.

In addition, by selectively turning off respective light emitting diodes 32A and respective laser diodes 32B according to the vehicle traveling situation and forming the light distribution patterns PM1 and PM2 in which a part of the high beam light distribution pattern PH1 is omitted, it is possible to secure the forward visibility of an own vehicle driver without giving glare to an oncoming vehicle driver or a preceding vehicle driver.

According to the present exemplary embodiment, in the vehicle lamp 10 configured so as to form the pair of left and right light distribution patterns PL and PR by irradiation light from the pair of lamp modules 20L and 20R, it is possible to increase the forward visibility of an own vehicle driver.

Moreover, according to the present exemplary embodiment, the above operational effect may be acquired without requiring the rotation of the respective lamp modules 20L and 20R in the left-and-right direction. This may make a lamp configuration inexpensive.

At this time, in the present exemplary embodiment, since the first lamp unit 22A of each lamp module 20L or 20R is configured to form a corresponding first light distribution pattern PL1 or PR1 as a light distribution pattern having the cutoff line CLL or CLR that extends in the up-and-down direction on the line V-V side (that is, on the center side of the pair of left and right light distribution patterns PL and PR), it is possible to further enhance the forward visibility of an own vehicle driver without giving glare to a preceding vehicle driver.

In addition, in the present exemplary embodiment, die second lamp unit 22B of each lamp module 20L or 20R is configured to form a corresponding second light distribution pattern PL2 or PR2 at the position near the lower end edge of the first light distribution pattern PL1 or PR1, it is possible to sufficiently enhance the forward visibility of an own vehicle driver while preventing the near distance area of the traveling path in front of the vehicle from becoming excessively bright.

In the exemplary embodiment, it has been described that both the first and second lamp units 22A and 22B of the respective lamp modules 20L and 20R are configured as a parabolic lamp unit. However, one or both of the first and second lamp units 22A and 22B may be configured as other types of lamp units (e.g., a projector-type lamp unit or a direct-type lamp unit).

In the above exemplary embodiment, it has been described that the pair of lamp modules 20L and 20R is disposed on both the left and right sides of the front end portion of the vehicle. However, other arrangements may be adopted In the above exemplary embodiment, it has been described that the in-vehicle camera 52, the vehicle speed sensor 54, and the steering angle sensor 56 are connected to the control unit 50. In addition to these components, a navigation device may be connected to the control unit 50 so that the turn-on/off control of the first and second lamp units 22A and 22B may be performed using navigation data.

Next, a second exemplary embodiment of the present disclosure will be described.

Figure 5:
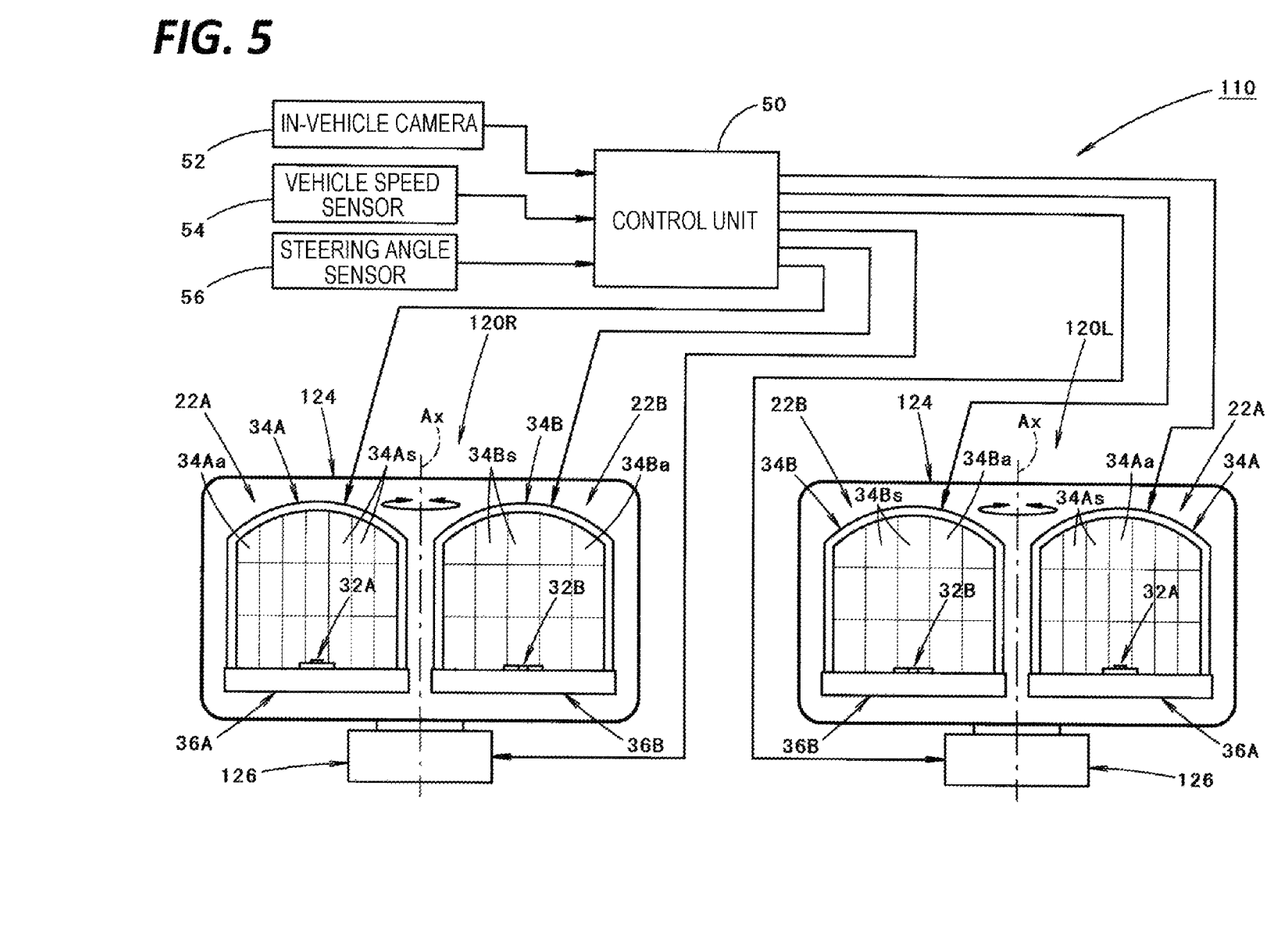
FIG. 5 is a front view illustrating a vehicle lamp according to a second exemplary embodiment of the present disclosure.

FIG. 5 is a front view illustrating a vehicle lamp 110 according to the present exemplary embodiment.

As illustrated in FIG. 5, the basic configuration of the vehicle lamp 110 is the same as that of the vehicle lamp 10 according to the first exemplary embodiment. However, the configuration of each lamp module 120L or 120R partially differs from that of the first exemplary embodiment.

That is, although the configuration of the first and second lamp units 22A and 22B of each lamp module 120L or 120R of the present exemplary embodiment is the same as that of the first exemplary embodiment, a support frame 124 that supports the first and second lamp units 22A and 22B is configured to be supported by a rotation mechanism 126. In addition, each lamp module 120L or 120R is configured such that the first and second lamp units 22A and 22B are rotatable, along with the support frame 124, in the left-and-right direction around the vertical axis Ax by the rotation mechanism 126.

The rotation mechanisms 126 of each lamp module 120L or 120R is controlled to be individually driven by the control unit 50 based on signals that are input from the in-vehicle camera 52, the vehicle speed sensor 54, and the steering angle sensor 56 to the control unit 50.

Figure 6A:
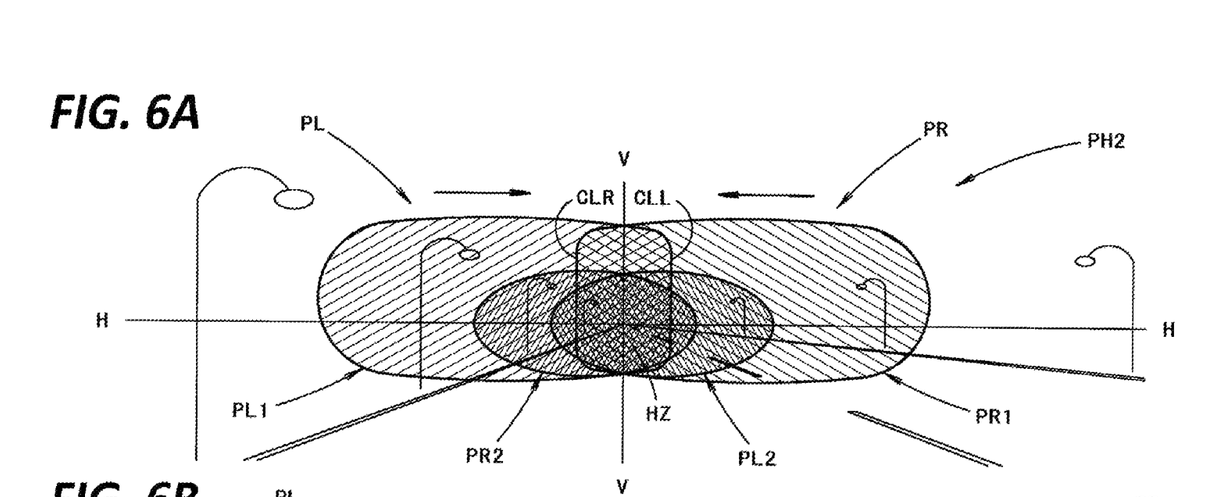
FIGS. 6A and 6B are perspectives view illustrating two types of high beam light distribution patterns, respectively, which are formed by irradiation light from the vehicle lamp according to the second exemplary embodiment
Figure 6B:
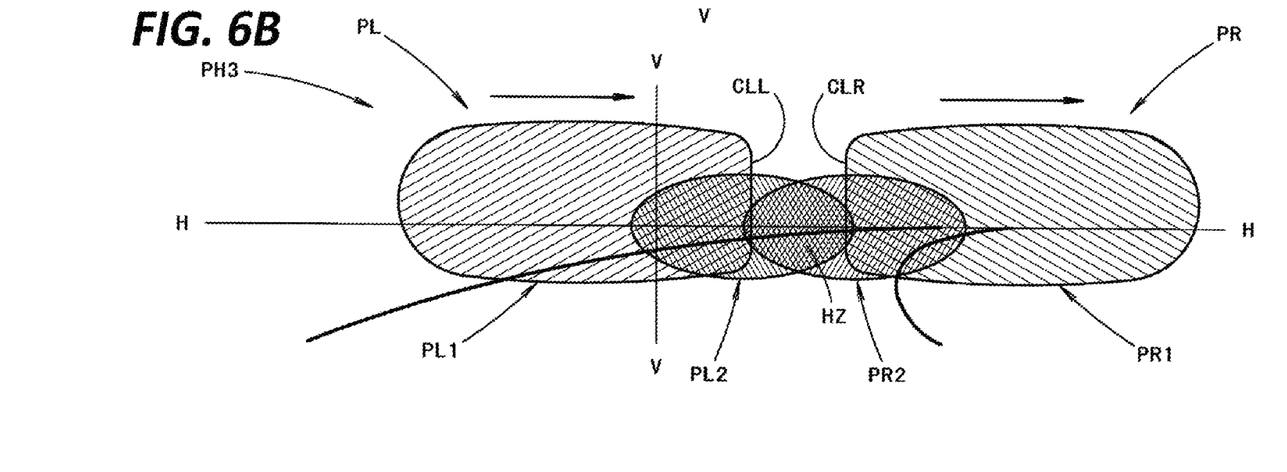

FIGS. 6A and 6B are perspective views illustrating two types of high beam light distribution patterns PH2 and PH3 formed by irradiation light from the vehicle lamp 110.

The high beam light distribution pattern PH2 illustrated in FIG. 6A is formed as a light distribution pattern in which the pair of left and right light distribution patterns PL and PR are displaced toward the line V-V, compared to the high beam light distribution pattern PH1 illustrated in FIG. 3A.

That is, although the shape of each light distribution pattern PL or PR constituting the high beam light distribution pattern PH2 is the same as that of the high beam light distribution pattern PH1, the left light distribution pattern PL is displaced rightward so that the cutoff line CLL of the first light distribution pattern PL1 is located at a position slightly spaced apart rightward from the line V-V, and the right light distribution pattern PR is displaced leftward so that the cutoff line CLR of the first light distribution pattern PR1 is located at a position slightly spaced apart leftward from the V-V.

In addition, in the present exemplary embodiment, the high beam light distribution pattern PH1 is configured by the pair of left and right light distribution patterns PL and PR formed in a state where the first and second lamp units 22A and 22B of the respective lamp modules 120L and 120R face the vehicle front direction (that is, a state where the rotation mechanism 126 is not driven) (hereinafter referred to as the "reference state").

In addition, the high beam light distribution pattern PH2 is formed by rotating the first and second lamp units 22A and 22B of the left lamp module 120L slightly rightward from the reference state and rotating the first and second lamp units 22A and 22B of the right lamp module 120L slightly leftward from the reference state by the same amount.

Although the high beam light distribution pattern PH2 has a smaller overall width in the left-and-right direction than the high beam light distribution pattern PH1, the overlap degree of the pair of left and right light distribution patterns PL and PR is increased compared to the high beam light distribution pattern PH1. Thereby, the high beam light distribution pattern PH2 has an increased horizontal width of the high luminous intensity area HZ about H-V compared to that in the high beam light distribution pattern PH1.

By forming the high beam light distribution pattern PH2, the remote distance area of the traveling path in front of the vehicle may be more brightly irradiated, and as a result, the remote distance visibility of an own vehicle driver may be sufficiently secured during, for example, high speed traveling.

The high beam light distribution pattern PH3 illustrated in FIG. 6B is a light distribution pattern formed via rightward displacement of the entire high beam light distribution pattern PH1 illustrated in FIG. 3A.

That is, although the shape and the relative positional relationship of the respective light distribution patterns PL and PR constituting the high beam light distribution pattern PH2 are the same as those in the high beam light distribution pattern PH1, the high luminous intensity area HZ thereof is displaced to a position far spaced apart rightward from the line V-V.

The high beam light distribution pattern PH3 is formed by rotating the first and second lamp units 22A and 22B of the respective lamp modules 120L and 120R rightward by the same amount from the reference state.

By forming the high beam light distribution pattern PH3, it is possible to sufficiently secure the forward visibility of an own vehicle driver even in a case where the traveling path in front of the vehicle is curved rightward.

In that event, by selectively turning off each light emitting diode 32A and each laser diode 32B according to the vehicle traveling situation so as to form a light distribution pattern in which a part of the high beam light distribution pattern PH3 is omitted, it is also possible to secure the forward visibility of an own vehicle driver without giving glare to an oncoming vehicle driver or a preceding vehicle driver.

According to the exemplary embodiment described above, it is possible to obtain the same operational effect as in the case of the first exemplary embodiment, and it is also possible to obtain the following operational effect.

That is, since the first and second lamp units 22A and 22B of the respective lamp modules 120L and 120R are configured to be integrally rotatable in the left-and-right direction, according to the vehicle traveling situation, it may be easy to widely irradiate the traveling path in front of the vehicle, to increase the remote distance visibility, or to increase the forward visibility of an own vehicle driver without giving glare to an oncoming vehicle driver or a preceding vehicle driver.

In addition, the numerical values illustrated as the specifications in each of the exemplary embodiments are merely given by way of an example, and may of course be appropriately set to different values.

In addition, the present disclosure is not limited to the configurations described in the respective exemplary embodiments, and various other modified configurations may be adopted.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A vehicle lamp comprising:

a pair of lamp modules configured to form a pair of left and right light distribution patterns by irradiation light therefrom, wherein each of the lamp modules includes a first lamp unit that uses a light emitting diode as a light source and a second lamp unit that uses a laser diode as a light source, and is configured to form a horizontally elongated first light distribution pattern by irradiation light from the first lamp unit and to form a second light distribution pattern, which is smaller and brighter than the first light distribution pattern, by irradiation light from the second lamp unit, the first lamp units in the pair of lamp modules are configured to form a pair of the first light distribution patterns having a predetermined distance therebetween in a left-and-right direction, the second lamp units in the pair of lamp modules are configured to form pair of the second light distribution patterns so as to partially overlap each other between the pair of first light distribution patterns and to partially overlap the pair of first light distribution patterns, and the light emitting diode and the laser diode are configured to be selectively turned on.

2. The vehicle lamp of claim 1, wherein the first lamp unit of each of the lamp modules is configured to form, as the first light distribution pattern, a light distribution pattern having a cutoff line that extends in an up-and-down direction at a center side of the pair of left and right light distribution patterns.

3. The vehicle lamp of claim 1, wherein the second lamp unit of each lamp module is configured to form the second light distribution pattern at a position near the lower end edge of the first light distribution pattern.

4. The vehicle lamp of claim 2, wherein the second lamp unit of each lamp module is configured to form the second light distribution pattern at a position near the lower end edge of the first light distribution pattern.

5. The vehicle lamp of claim 1, wherein each lamp module is configured such that the first and second lamp units are integrally rotatable in the left-and-right direction.

6. The vehicle lamp of claim 2, wherein each lamp module is configured such that the first and second lamp units are integrally rotatable in the left-and-right direction.

7. The vehicle lamp of claim 3, wherein each lamp module is configured such that the first and second lamp units are integrally rotatable in the left-and-right direction.

8. The vehicle lamp of claim 4, wherein each lamp module is configured such that the first and second lamp units are integrally rotatable in the left-and-right direction.

* * * * *